(12) United States Patent
Martins Aguiar et al.

(10) Patent No.: US 11,970,923 B2
(45) Date of Patent: Apr. 30, 2024

(54) DOWNHOLE ELECTRICAL GENERATOR

(71) Applicant: Halliburton Energy Services, Inc., Houston, TX (US)

(72) Inventors: Ana Beatriz Martins Aguiar, Rio de Janeiro (BR); Thales Alexandre Carvalho Maia, Belo Horizonte (BR); Osvane Abreu Faria, Paiva (BR); Ricardo Lima de Pereira Martins, Rio de Janeiro (BR); Nagaraja K. Pai, Lancaster, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 373 days.

(21) Appl. No.: 17/217,657

(22) Filed: Mar. 30, 2021

(65) Prior Publication Data
US 2022/0320959 A1 Oct. 6, 2022

(51) Int. Cl.
*E21B 41/00* (2006.01)
*H02K 1/12* (2006.01)
(Continued)

(52) U.S. Cl.
CPC ........... *E21B 41/0085* (2013.01); *H02K 1/12* (2013.01); *H02K 1/27* (2013.01); *H02K 5/00* (2013.01); *H02K 7/003* (2013.01); *H02K 7/1823* (2013.01)

(58) Field of Classification Search
CPC ..... E21B 41/0085; H02K 7/1823; H02K 1/27
See application file for complete search history.

(56) References Cited

U.S. PATENT DOCUMENTS

| | | | | |
|---|---|---|---|---|
| 5,988,992 | A | * 11/1999 | Tetzlaff | E21B 43/128 417/424.2 |
| 10,697,276 | B2 | 6/2020 | Mcmullen | |

(Continued)

FOREIGN PATENT DOCUMENTS

| | | |
|---|---|---|
| WO | 2020023831 A1 | 1/2020 |
| WO | 2000036268 A1 | 6/2020 |

OTHER PUBLICATIONS

PCT Application No. PCT/US2021/025258, International Search Report, dated Dec. 16, 2021, 3 pages.
(Continued)

*Primary Examiner* — Kristyn A Hall
(74) *Attorney, Agent, or Firm* — DeLizio, Peacock, Lewin & Guerra, LLP

(57) ABSTRACT

Apparatuses, systems and methods for implementing a downhole alternator assembly are disclosed. In some embodiments, a downhole alternator assembly comprises a casing; a turbine disposed within the casing and actuated by a drilling fluid flow; and a rotor disposed within the casing. The rotor includes a cylindrical rotor core rotated by the turbine; a plurality of permanent magnets disposed in the cylindrical rotor core; and a drilling fluid channel extending axially through the center of the cylindrical rotor core. The downhole alternator assembly includes a stator disposed within the casing. The stator includes a cylindrical stator core disposed concentrically between the cylindrical rotor core and the casing; conductor windings within the cylindrical stator core; and a plurality of radially distributed fluid channels extending axially within the cylindrical stator core between a front end of the cylindrical stator core and a back end of the cylindrical stator core.

20 Claims, 10 Drawing Sheets

(51) Int. Cl.
    *H02K 1/27*     (2022.01)
    *H02K 5/00*     (2006.01)
    *H02K 7/00*     (2006.01)
    *H02K 7/18*     (2006.01)

(56) References Cited

U.S. PATENT DOCUMENTS

| | | |
|---|---|---|
| 2009/0133867 A1 | 5/2009 | Kuckes |
| 2011/0260457 A1* | 10/2011 | Hall .................... H02K 21/145 |
| | | 310/156.01 |
| 2015/0034294 A1 | 2/2015 | Miles et al. |
| 2015/0345260 A1 | 12/2015 | Green et al. |
| 2018/0163514 A1 | 6/2018 | Guven et al. |
| 2018/0179872 A1* | 6/2018 | Filatov .................. E21B 43/128 |
| 2019/0024484 A1 | 1/2019 | Rajagopalan et al. |
| 2019/0178099 A1* | 6/2019 | Gatzen .................... H02K 11/05 |
| 2019/0284907 A1 | 9/2019 | Loh et al. |
| 2019/0363655 A1 | 11/2019 | Rajagopalan |
| 2020/0032630 A1* | 1/2020 | Artinian ................ F04D 29/628 |
| 2020/0063543 A1 | 2/2020 | Pai |
| 2020/0295640 A1 | 9/2020 | Tegeler et al. |

OTHER PUBLICATIONS

PCT Application No. PCT/US2021/025258, Written Opinion, dated Dec. 16, 2021, 5 pages.

* cited by examiner

DOWNHOLE ELECTRICAL GENERATOR

TECHNICAL FIELD

The disclosure generally relates to the field of downhole power supplies and to electrical generator systems and methods for generating electricity within a wellbore.

BACKGROUND

Tools used for downhole exploration and production operations frequently require electrical power sources. For example, test tools such as logging while drilling (LWD) and measuring while drilling (MWD) tools include electrical and electronic subsystems and components that depend on power sources to reliably provide significant voltage and current levels. Such components may include measurement tools such as acoustic, electromagnetic measurement tools and/or digital signal processors and computer processors to process the measurement data. Power may be required for other downhole applications such as for pumping or otherwise pressurizing downhole fluids to be moved within a wellbore. Downhole tools may utilize various power supplies such as in situ battery sources or surface sources that are coupled to downhole tools via suitable cabling and/or that may be used to charge downhole batteries. Higher power levels may be required for increasingly complex testing or production applications such as pulse power drilling operations. Providing adequate voltage and current supplies to remote downhole tools may entail substantial power transmission losses and/or substantial additional drill string and drilling tool complexity required to reliably provide sufficient power levels to remote and confined downhole locations.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. In other instances, well-known instruction instances, protocols, structures and techniques have not been shown in detail in order not to obfuscate the description.

Overview

Methods, systems, and apparatuses are disclosed for locally sourcing electrical power to downhole components such as downhole electrical instruments and electrically controlled components such as pumps, valves, and downhole instruments. In particular, some embodiments provide a downhole generator configured to provide a high-power levels required for pulse power drilling (PPD) operations. A compact, high-energy electrical generator assembly may be configured for downhole deployment such as within or otherwise integral to a drill string such as a pulse power drill string. In some embodiments, the generator assembly includes a turbine sub-assembly including a set of turbine blades attached to a turbine shaft that is axially aligned with a drilling fluid input port.

The generator assembly further includes an alternator sub-assembly that may comprise one or more sets of rotor and stator pairs disposed within the casing. The rotor/stator pairs may be configured as stacks such as laminated stacks each including a rotor/stator pair. Each of the rotors may include a cylindrical rotor core, a plurality of permanent magnets disposed on or within the rotor core, and a drilling fluid channel formed and axially extending along the center of the rotor core. Each of the stators is disposed between a respective rotor and the casing and each may include a cylindrical stator core, conductor windings disposed within the stator core, and a plurality of radially distributed channels extending axially within the stator core between a front end of the stator core and a back end of the stator core. An internal coolant circulation system may be implemented using the stator channels in addition to a drilling fluid channel within the rotor to provide adequate thermal regulation for the generator during high power operations in remote and confined downhole locations.

Example Illustrations

Figure 1:
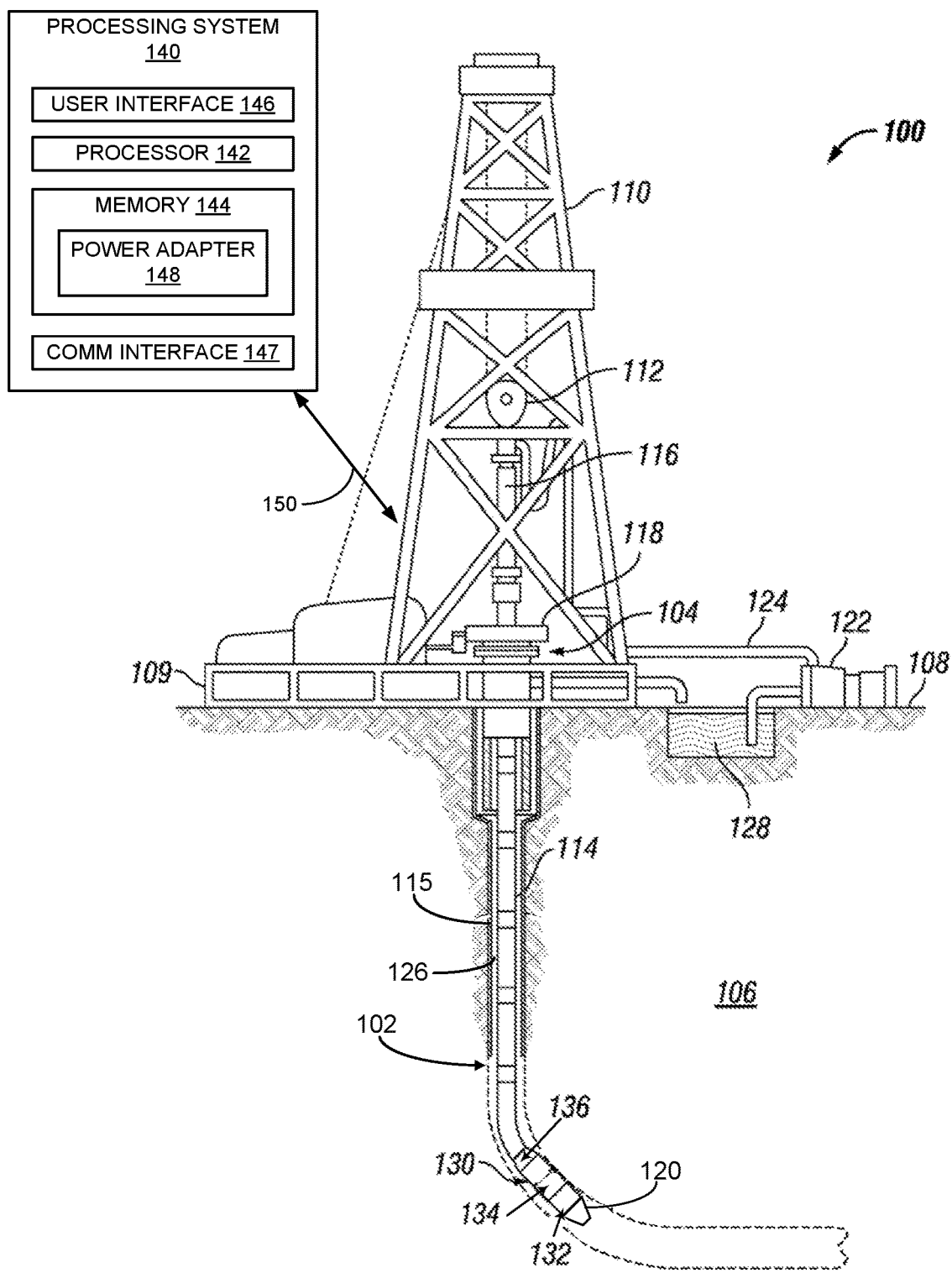
FIG. 1 is a schematic depiction of a drilling system having a bottom hole assembly (BHA) configured in accordance with some embodiments.

FIG. 1 is a schematic depiction of a drilling system 100 having a bottom hole assembly (BHA) 130 configured in accordance with some embodiments. As shown, a wellbore 102 extends from a wellhead 104 into a subterranean formation 106 and may include vertical, curved, and other types of wellbore geometries and orientations. Wellbore 102 may be cased or uncased and/or include cased and uncased portions as depicted in FIG. 1. For example, a casing 115 within wellbore 102 may comprise a metallic material that may be conductive and magnetic such as a metallic a casing, liner, tubing, or other elongated tubular disposed within wellbore 102.

Wellbore 102 extends through a portion of subterranean formation 106. As illustrated in FIG. 1, wellbore 102 initially extends substantially vertically into subterranean formation 106, and subsequently curves along a bend section before beginning a substantially horizontal extension. While FIG. 1 depicts a land-based system and operation, the system and method principles described herein may be applicable to offshore operations that employ floating or sea-based platforms and rigs.

Drilling system 100 includes a drilling platform 109 that supports a derrick 110 having a traveling block 112 for raising and lowering a drill string 114 within wellbore 102. Depending on the state of development and operation, drill string 114 may include, but is not limited to, drill pipe, coiled tubing, and other drill string components. A kelly 116 may support drill string 114 as it is raised and lowered via a rotary table 118. A drill bit 120 is attached to the distal end of drill string 114 and is configured to penetrate downhole material layers to create a wellbore 102. Drill bit 120 may be a mechanical drill bit that penetrates via friction and cutting action of drill bit such as by creating a substantially cylindrical hole (wellbore) by rotary action of the bit such as may be imparted either by a downhole motor and/or via rotation of drill string 114 from the surface 108, In some embodiments, drill bit 120 may be a pulse power drill (PPD) bit, sometimes referred to as a PPD drill head that includes multiple electrodes configured to penetrate formation 106 by transmitting high-power pulses into formation rock. The pulses result in very high internal tension pressures within the formation such as due to vaporization of trapped formation fluids, resulting in fracturing of the rock. A surface drilling fluid pump 122 may circulate drilling fluid (sometimes referred to as drilling mud) through a feed pipe 124 to kelly 116, downhole through the interior of drill string 114, through orifices in drill bit 120, hack to surface 108 via an annulus 126 between drill string 114 and wellbore 102, and into a retention pit 128 from which it is re-conditioned and re-circulated.

Drill bit 120 is incorporated as part of a bottom hole assembly (BHA) 130 at the distal end of drill string 114. BHA 130 further comprises one or more of a turbine 136, an alternator 134, and a power conditioner system 132 that may include an alternating current (AC) to direct current (DC) converter. Although not expressly depicted, BHA 130 may include other components such as a power module, steering module, telemetry subassembly, and/or other sensors and instrumentation. In some embodiments, BHA 130 may include components for implementing measurement-while drilling (MWD) or logging-while-drilling (LWD) during drilling operations.

BHA 130 may be communicatively coupled to and/or controlled by a processing system 140, which may be disposed on surface 108. In some embodiments all or portions of processing system 140 may be disposed down hole such as integrated within BHA 130. All or portions of processing system 140 disposed on surface 108 may communicate with BHA 1.30 through a communication line (not illustrated) disposed within or proximate to drill string 114. For instance, wireless communication may be used to transmit information back and forth between processing system 140 and BHA 130. Processing system 140 may transmit information to BHA 130 and may receive as well as process information collected and recorded by BHA 130. Whether surface or downhole deployed, processing system 140 may include a microprocessor 142 configured to receive and process information from BHA 130 using program code and data stored within a memory 144 as well as input data and instructions received via a user interface (UI) 146. BHA 130 may include additional electronic components such as an analog-to-digital converter (ADC), amplifiers, and others that may be configured to process information prior to transmission of the information to data processing system 140.

Various communication systems and components and corresponding methods and protocols may be used to transmit signals from BHA 130 to processing system 140, including, but not limited to, wired pipe telemetry, mud-pulse telemetry, acoustic telemetry, optical telemetry, and electromagnetic (EM) telemetry. While not illustrated, BHA 130 may include a telemetry subassembly that may transmit information such as drilling operation information such as drilling penetration metrics to processing system 140 on surface 108. For example, an acoustic source such as a piezoelectric source in the telemetry subassembly may be operable to generate pressure pukes in the drilling fluid that propagate along the fluid stream to surface 108 where they are detected by a corresponding acoustic receiver (e.g., pressure transducer). An analog-to-digital converter together with encoding/decoding circuitry may generate a digital conversion of the analog telemetry signals to processing system 140 via a communication link 150, which may be a wired or wireless link. The transmitted information may be analyzed and processed by processing system 140 using program code such as stored in and executed from memory 144.

Drilling fluid pump 122 provides various fluid pressures to provide a flow of drilling fluid within drill string 114, which flows to turbine 136. The drilling fluid flows through turbine 136, exiting turbine 136 and flowing into other sub-sections or components of BHA 130. The flow of drilling fluid through turbine 136 causes turbine 136 to mechanically rotate. This mechanical rotation is coupled via shaft-to-shaft coupling to alternator 134 to generate electrical power. In conjunction with power level instructions from processor system 140, alternator 134 may controllably provide electrical power to various components within BHA 130. The power output from alternator 134 is stored as electrical energy within charge storage components such as capacitors within a capacitor bank and/or batteries (not depicted).

For embodiments in which BHA 130 implements PPD operations, the stored energy may be applied to and output from electrodes (not depicted) on drill bit 120 as periodic electrical discharges to extend wellbore 102. In such embodiments, the drilling fluid flows through components within BHA 130 such as alternator 134 and flows out from ports (not depicted) on drill bit 120 and back toward the surface within annulus 126 to aid in the removal of the debris generated by the breaking up of the formation material. In addition, the flow of drilling fluid may provide cooling to one or more devices and to one or more portions of BHA 130 such as alternator 134 and drill bit 120.

Turbine 136 is disposed at a top of an electric generator assembly comprising turbine 136, alternator 134, and power conditioner system 132. For embodiments in which the system loads powered by alternator 134 consume AC power, power conditioner system 132 may not be required or included in BHA 130. As depicted and described in further detail with reference to FIG. 2A, an overall electric generator assembly includes an alternator sub-assembly actuated by the turbine to generate an AC signal that is converted to DC and otherwise conditioned by a power conditioner sub-assembly. The generator assembly provides electrical power to downhole components within BHA 130 including PPD electrodes for PPD operations. The electrical power supply may be hard wired or may be sourced and modified based on control signals from data processing system 140 to a generator controller (not depicted) within alternator 134. For example, data processing system 140 may include processing and storage components configured to receive and process PPD information such as arcing information from BHA 130 to generate power control signals. To this end, data processing system 140 includes a power adapter program 148 stored in and executed from memory 144. Power adapter program 148 includes program instructions and data configured to process information from BHA 130 relating to downhole power requirements. In PPD applications, power adapter program 148 is configured to determine and adjust power supply requirements for alternator 134.

Electric generator systems and sub-systems that may be implemented in the drilling system 100 depicted in FIG. 1 may be configured to efficiently generate relatively high power levels (e.g., current and/or voltage levels) in downhole drilling environments. In such environments, the drill string and components such as turbine, alternator, and power conditioner sub-assemblies require form factors that accommodate relatively elongated confined borehole spacing that frequently is non-linear. For example, in some embodiments two or more modular alternator sub-assemblies may be mechanically and electrically interconnected in series to increase electric power generation levels while maintaining a relatively narrow and flexible overall body profile, Furthermore, the generator assembly and sub-assembly may be configured to provide adequate thermal regulation and pressure protection in remote downhole locations having adverse pressure and temperature conditions, as well as restrictive fluid transfer spacing for enabling high power alternator output.

Figure 2A:
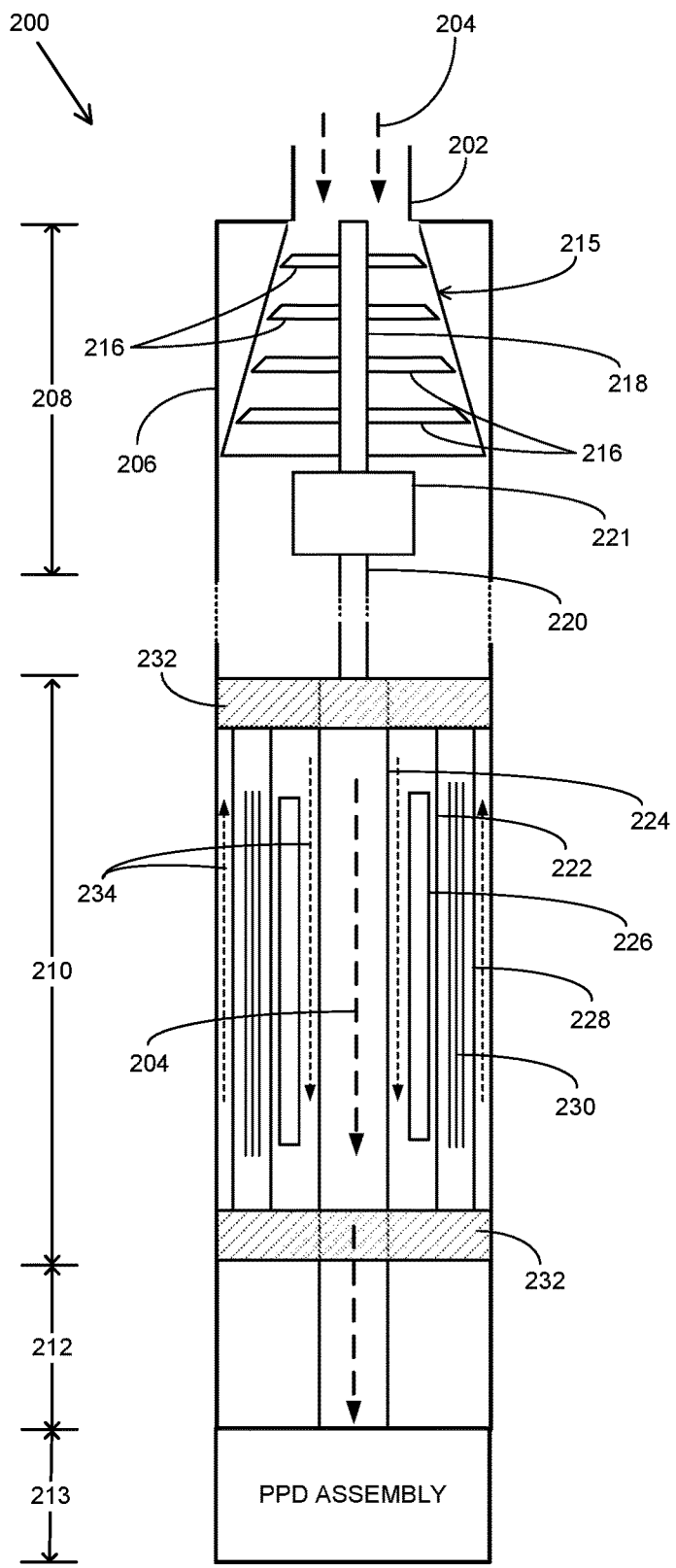
FIG. 2A depicts a generator assembly that may be implemented in a BHA in accordance with some embodiments.

FIG. 2A depicts an electric generator assembly 200 that may be implemented in a BHA, such as BHA 130, in accordance with some embodiments. In the depicted embodiment, generator assembly 200 is coupled to a PPD assembly 213. Generator assembly 200 includes a turbine sub-assembly 208, an alternator sub-assembly 210, and a power conditioner sub-assembly 212 all housed within a casing 206. As shown in FIG. 2A, turbine sub-assembly 208 is positioned above alternator sub-assembly 210 and is configured to connect to a top coupling interface of the alternator sub-assembly 210. Power conditioner sub-assembly 212 is positioned below alternator sub-assembly 210 and is configured to connect to a bottom coupling interface of the alternator sub-assembly 210. In combination, sub-assemblies 208, 210, and 212 include components configured to provide drilling fluid flow into and out of the assembly, translate energy from the drilling fluid flow into mechanical energy and finally electrical energy, and adapter the power output into suitable forms for use by downhole components such as PPD components within PPD assembly 213.

Turbine sub-assembly 208 includes an input port 202 into which drilling fluid 204 enters the sub-assembly and flows through a sequence of energy conversion/translation components, such as a set of blades 216, within a turbine 215. Input port 202 may comprise an output of a controllable valve that controls the volume and/or speed of fluid flow of drilling fluid 204 into turbine 215. In some embodiments, turbine 215 includes blades 216 that rotate as drilling fluid 204 flows through blades 216 during drilling operation. The rotational energy is transferred to a turbine shaft 218 to which blades 216 are fixedly attached.

Alternator sub-assembly 210 includes a rotor comprising a rotor core 222 that forms the center section of alternator sub-assembly 210 and is configured to be rotated around a set of bearings 232 at the top and the bottom of alternator sub-assembly 210. Rotor core 222 includes a set of magnets, such as permanent magnets 226, that provide magnetic fields surrounding rotor core 222. Rotor core 222 is mechanically coupled to turbine shaft 218 such as via an intermediate shaft 220 and shaft coupling 221. In some embodiments, turbine shaft 218 is coupled directly to rotor core 222, for example, through shaft coupling 221. In this manner, when turbine shaft 218 is rotated such as by flow of drilling fluid 204 through turbine 215, the mechanical rotation is transferred directly to rotor core 222, causing rotor core 222 to rotate at the same rotational speed as turbine shaft 218. In some embodiments, shaft coupling 221 comprises a gear box configured to couple and de-couple turbine shaft 218 to and from intermediate shaft 220 and to adjust the speed of rotation translation between turbine shaft 218 and intermediate shaft 220.

Alternator sub-assembly 210 further includes a cylindrical stator core 228 within which a set of stator coil windings 230 are disposed in a radially distributed manner. Stator core 228 encircles a portion of rotor core 222 at least along a longitudinal segment between the top and bottom of alternator sub-assembly 210. Stator core 228 is fixed in position relative to casing 206 and thus is the "stator" portion of alternator sub-assembly 210. In this configuration, when the magnetic field generated by permanent magnets 226 within rotor core 222 are rotated in proximity of stator core 228, electrical current is generated in coil windings 230. The output current from coil windings 230 is conducted through a set of output conductors, such as conductive wires, and coupled to power conditioner sub-assembly 212 for further processing. PPD assembly 213 includes components for implementing pulse power drilling including capacitor banks for storing energy output from power conditioner sub-assembly 212. PPD assembly 213 further includes electrodes from which high-power pulses are emitted and switches and switch controllers for discharging the capacitor banks to generate the pulses.

During electrical current generation, drilling fluid 204 flows through turbine 215 and is directed to flow through a center flow tube 224 that is axially aligned within the center of rotor core 222 along the longitudinal axis of the overall generator assembly. Drilling fluid 204 enters center flow tube 224 and continues to flow into power conditioner sub-assembly 212. The flow of drilling fluid 204 through rotor core 222 and other components removes heat via convective thermal transfer that is removed from the assembly and from a drill string in which the assembly is incorporated when drilling fluid is expelled from a drill bit/head. Drilling fluid 201 flows upward within the wellbore annulus during drilling and extracts heat from the exterior walls of alternator sub-assembly 210, power conditioner sub-assembly 212, and PPD assembly 213.

In addition to cooling provided by drilling fluid 204, alternator sub-assembly 210 may include an internal coolant circulation system to provide enhanced thermal regulation particularly to remove heat generated in coil windings 230. For example, alternator sub-assembly 210 includes internal coolant flow paths 234 in which a coolant liquid, such as a dielectric liquid (e.g., dielectric oil) may be internally pressurized, such as via an impeller (not depicted) to circulate within the depicted fluid channels of flow paths 234 that comprise multiple radially distributed fluid channels extending axially within and between the front end and back end stator core 228 and also within and between the front end and the back end of rotor core 228. As depicted and described in further detail with reference to FIGS. 3A, 3B, 4A, 4B, 5A, and 5B, a variety of different coolant circulation channels may be implemented. While not expressly depicted in FIG. 2A, each of bearings 232 may include a respective housing that may include an internal coolant chamber, such as a dielectric oil chamber, filled with a lubricating and thermally conductive liquid to lubricate bearings 232. A sealed piston/expansion chamber may also be incorporated within the bearing housings to compensate for thermal expansion of the liquids/oils.

The turbine and alternator produce an output comprising one or more AC output waveforms. The AC electrical power generated by the turbine and alternator combination requires conditioning before the electrical power is provided to downhole electrical components such as PPD components. Power conditioner sub-assembly 212 may be configured to rectify, regulate, boost, or otherwise transform the AC output from alternator sub-assembly 210. Power conditioner sub-assembly 212 may be further configured to implement filtering operations on the output from alternator sub-assembly 210 before the conditioned electrical power is provided to downhole consumer devices such as PPD capacitor banks. Power conditioner sub-assembly 212 therefore includes components such as regulators and rectifiers to convert the AC voltage/current from coil windings 230 in DC voltage/current to be used, for example, to charge capacitor banks for PPD operation.

Figure 2B:
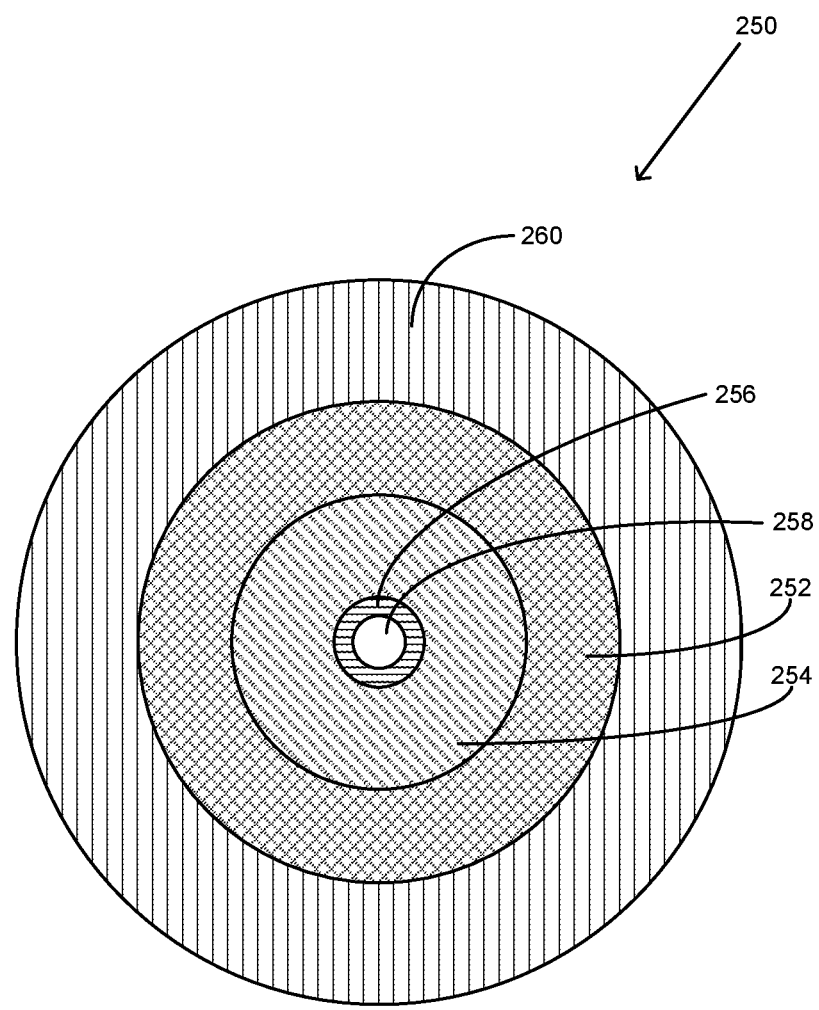
FIG. 2B illustrates a lateral cross-section view of a generator assembly that may be implemented in a BHA in accordance with some embodiments.

The embodiment in FIG. 2A depicts generator assembly 200 as having turbine 215 installed in an inline configuration in which drilling fluid flows from input port 202 through the turbine blades 216 and then into the internal flow paths within alternator sub-assembly 210. FIG. 2B illustrates a lateral cross-section view of an alternate embodiment of a generator assembly 250 that utilizes a radially-stacked turbine configuration. Generator assembly 250 includes many of components included in generator assembly 200 including a stator 252 cylindrically disposed around a rotor 254. Similar to the embodiment shown in FIG. 2A, generator assembly 250 further includes a rotor shaft 256 that is disposed in the radial center of rotor 254 and includes a fluid channel 258, such as may be a drilling fluid channel or an internal coolant fluid channel. In contrast to the embodiment shown in FIG. 2A, generator assembly 250 includes a turbine 260 that is disposed cylindrically around and therefore longitudinally overlaps at least some length of the inner situated generator components. In this configuration, the length of the overall generator assembly is reduced. Furthermore, the drilling fluid entering turbine 260 may flow in parallel with drilling fluid that enters the inner flow channel 258 from a common drill pipe source. Turbine 260 may include internal blades that are similar to blades 216 for turbine 215 or may be configured differently due to the annular profile. For example, the blades for turbine 260 may comprise any of a variety of helicoidal or helical type blades. While both FIGS. 2A and 2B depict the alternator sub-assemblies as including a stator/rotor assembly that is disposed inside the stator, in alternate embodiments, the rotor may be disposed outside the stator.

Figures 3A, 3B:
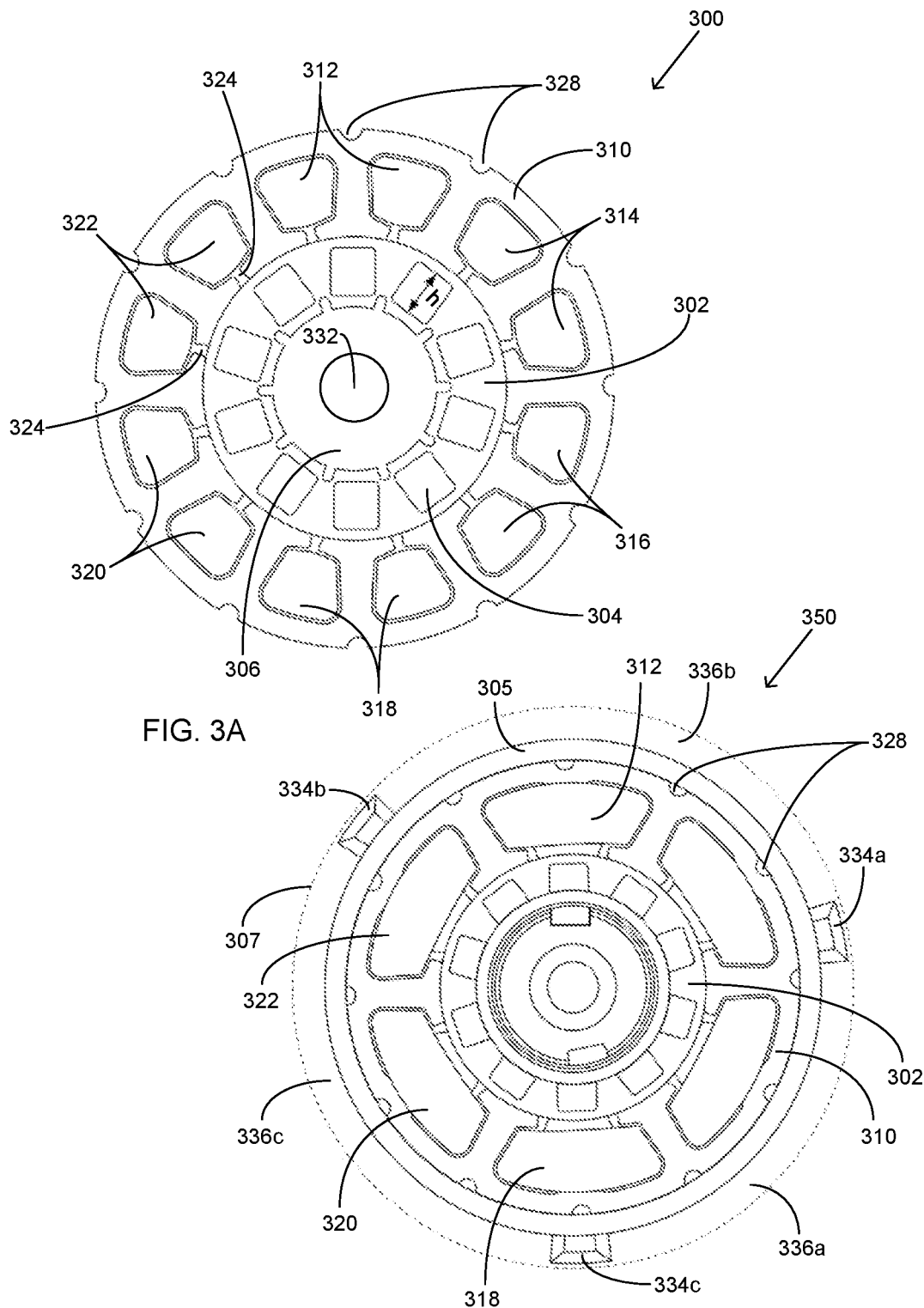
FIG. 3A illustrates a lateral cross-section view of a downhole alternator assembly in accordance with some embodiments.
FIG. 3B depicts a lateral cross-section view of a downhole alternator assembly in accordance with some embodiments.

FIG. 3A illustrates a lateral cross-section view of a downhole alternator assembly 300 in accordance with some embodiments. The components and sub-components depicted in FIG. 3A may be implemented in electric generator assemblies such as depicted in FIGS. 1-2. Alternator assembly 300 includes a rotor comprising a rotor core 302 in which multiple permanent magnets 304 are incorporated. The rotor is coupled to and rotated by an axially aligned rotor shaft 306 through which a drilling fluid channel 332 extends axially.

As illustrated in FIG. 3A, the rotor encircles the center portion of alternator assembly 300 and may be ring shaped or otherwise generally cylindrical in cross-section contour. Permanent magnets 304 may comprise a plurality of permanent magnets arranged in a radial pattern surrounding the longitudinal axis (i.e., the axial center) of alternator assembly 300. Permanent magnets 304 are represented in FIG. 3A as substantially rectangular components within rotor core 302. Rotor core 302 encloses permanent magnets 304 in the depicted embodiment including along the surfaces of permanent magnets 304 that face and are closest to the stator portion of alternator assembly 300. Because rotor core 302 encloses all surfaces of permanent magnets 304 at least in cross-section, permanent magnets 304 may be classified as buried magnets that are distinct from surface mounted magnets. In some embodiment, rotor core 302 comprises a plurality of radially distributed permanent magnets such as permanent magnets 304 except that permanent magnets 304 are surface mounted in that the inner surfaces of the magnets facing toward the stator portion are not covered by rotor core material.

In some embodiments, rotor core 302 comprises a ferromagnetic material composite such as iron or an iron alloy that is configured to enhance the magnetic field in terms of strength and/or geometry of permanent magnets 304. Other alloys with which rotor core 302 may be fabricated include cobalt-iron alloys, nickel-iron-cobalt alloys, or other alloys characterized by a high magnetic saturation typically greater than 1.3 T possibly up to or exceeding 2.3 T. The alloys used to fabricate the rotor are typically the same as used for fabricating the stator. The composition of material used to form rotor core 302 and the arrangement of permanent magnets 304 within rotor core 302 are designed to enhance the strength of the magnetic field generated by permanent magnets 304 that is imposed on the stator portion of alternator assembly 300. Permanent magnets 304 may comprise various geometries and include a significant depth or height, h, parameter. The height parameter, h, is depicted by double arrow within one of permanent magnets 304 and represents the distance between the edge of a permanent magnet furthest removed from the opposing surface of the stator portion and the edge of the magnet closest to the opposing surface of the stator portion. A larger the magnet height generally results in a larger magnitude (more intense) magnetic field from the permanent magnet. In some embodiments, the magnet height for permanent magnets 304, whether buried or surface-mounted, is 0.75 inches or greater.

The stator portion of alternator assembly 300 includes a stator core 310 that concentrically encircles the rotor portion. In the example shown in FIG. 3A, the stator portion further includes a first stator coil winding 312, a second coil winding 314, a third coil winding 316, a fourth coil winding 318, a fifth coil winding 320, and a sixth coil winding 322. As shown, coil windings 312, 314, 316, 318, 320, and 322 are disposed in a radially distributed manner within stator core 310, which may comprise a substantially solid ferromagnetic material having multiple radially distributed longitudinally elongated cavities in which the coils windings are disposed. Coils windings 312, 314, 316, 318, 320, and 322 are formed within and wound around portions of stator core 310. Each of coil windings 312, 314, 316, 318, 320, and 322 may be formed from a length of wire comprising a conductive metal, such as copper, that is wound around portions of stator core 310. In the example shown in FIG. 3A, the stator portion includes six sets of stator coil windings 312, 314, 316, 318, 320, and 322, each illustratively separated into two halves with each corresponding coil winding half extending from some length parallel to the longitudinal axis of alternator assembly 300.

Coil windings 312, 314, 316, 318, 320, and 322 are wound and otherwise enclosed within the cavities/openings within stator core 310. The cavities that encase the coil windings comprise a plurality of cavities that extend lengthwise (axially, longitudinally) between a front end of stator core 310 and a back end of stator core 310. In some embodiments, the longitudinally extending cavities are configured as fluid channels as well as coil winding cavities. In this manner, drilling fluid and/or an internal coolant may be circulated within the cavities to transfer heat via convection or otherwise from coil windings 312, 314, 316, 318, 320, and 322 to the coolant circulating in the cavities. The stator portion may further include additional channels, such as channels 324 in the form of gaps within stator 310 that extend from the openings of stator core 310 toward the rotor portion. These gaps allow for thermal expansion and contraction of stator core 310, for example due to changes in temperature of stator core 310 during downhole operation. The gaps forming fluid channels 324 may also be used to provide a fluid flow path for a coolant fluid, such as drilling fluid, air, oil, to facilitate thermal regulation of alternator assembly 300 such as during PPD operations.

In some embodiments, stator core 310 may comprise a ferromagnetic material such as iron or an iron alloy composite that is configured to enhance the magnetic field proximate coil windings 312, 314, 316, 318, 320, and 322. Alloys with which rotor core 310 may be fabricated include cobalt-iron alloys, nickel-iron-cobalt alloys, or other alloys characterized by a high magnetic saturation typically greater than 1.3 T possibly up to or exceeding 2.3 T. The composition of the material used to form stator core 310 and the relative positioning and geometry of how the coils windings are disposed within stator core 310 are designed to enhance the magnetic field strengths generated by permanent magnets 304 and imposed on the coil windings. In some embodiments, a small gap and/or a lubricating material, such as a ceramic tube or tubes, may be included in the area between rotor core 302 and stator core 310. The gap and/or lubricating material provide spacing sufficient to enable substantially free relative rotational motion by minimizing friction and/or eliminating direct contact between the rotor portion and stator portion. Such separation and/or lubrication may facilitate free relative rotation particularly when alternator assembly 300 is subject to longitudinal bending forces during alternator operation that includes rotation of the rotor portion. In some embodiments, the gap includes a space equal to or approximately 0.5 millimeters or higher.

FIG. 3B depicts a lateral cross-section view of a downhole alternator assembly 350 as deployed within an alternator casing and drill string housing in accordance with some embodiments. As shown in FIG. 3B, the cross-section view of the rotor and stator portions, including stator coil windings 312, 314, 316, 318, 320, and 322 are depicted as a front end or back end cutaway view. The rotor and stator portions are disposed within a substantially cylindrical alternator casing 305 that encircles the outer perimeter of the stator portion of the rotor/stator assembly. Alternator casing 305 extends along the longitudinal axis of alternator assembly 350 for a length at least as long as the portion of the rotor/stator assembly that extends along the longitudinal axis.

Alternator casing 305 may be formed of a non-magnetic material, such as a non-magnetic metal or alloy, to avoid disrupting the electromagnetic fields surrounding permanent magnets 304 and coil windings 312, 314, 316, 318, 320, and 322. The non-magnetic property of alternator casing 305 also prevents or minimizes generation of eddy currents within alternator casing 305. Alternator casing 305 may further include a set of tabs, such as tabs 334a, 334b, and 334c that extend radially outward from the outer surface of alternator casing 305. Tabs 334a, 334b, and 334c may be spaced in an evenly distributed manner and extend a predefined distance away from the main body of alternator casing 305 in order to mechanically engage and fixedly position alternator casing 305 with respect to an inner wall 307 of an outer tool body.

One or more spaces are formed by tabs 334a, 334b, and 334c between the inner wall 307 of the tool body and the outer surface of alternator casing 305 and may be configured as fluid channels for a fluid, such as drilling fluid, that may be received from the turbine (not depicted) coupled to alternator assembly 350. In the depicted embodiment, three such drilling fluid channels 336a, 336b, and 336c are formed to provide an external flow path for heat exchange with the alternator outer boundary defined by alternator casing 305 while isolating the flow of drilling fluid from the inner chamber of alternator assembly 350 within alternator casing 305.

In addition to thermal transfer (e.g., cooling of alternator assembly 350) by the flow of drilling fluid, alternator assembly 350 may include an additional internal coolant system as described with reference to FIG. 3A. Such an internal coolant system may circulate a fluid (liquid or gas), such as air, water, or oil through fluid channels formed within alternator casing 305 such as fluid channels 328 formed within and at the outer surface of stator core 310 as well as the stator winding cavities that may also server as fluid channels and the fluid channels 324 formed by the gaps between the coil windings and rotor core 302. For example, the fluid channels may include fluid channels extending axially through stator core 310. The internal cooling system may comprise a closed system that is internally pressurized and configured to circulate the fluid through fluid channels using a pump, for example. The internal cooling system may further include a sealed heat exchange (e.g., a radiator) that is configured to transfer heat from the coolant fluid away from alternator assembly 350, for example, to the drilling fluid flow passing through one or more of drilling fluid channels 332, 336a, 336b, and 336c.

Figure 4A:
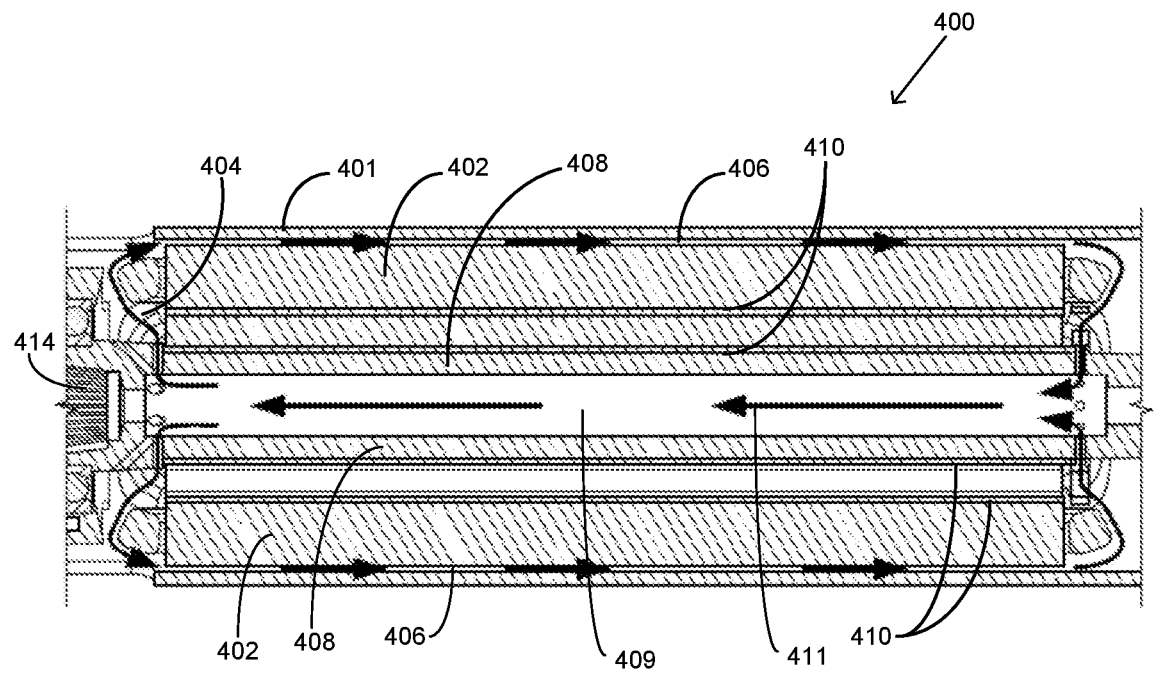
FIG. 4A illustrates a longitudinal cross-section view of a downhole alternator assembly in accordance with some embodiments.
Figure 4B:
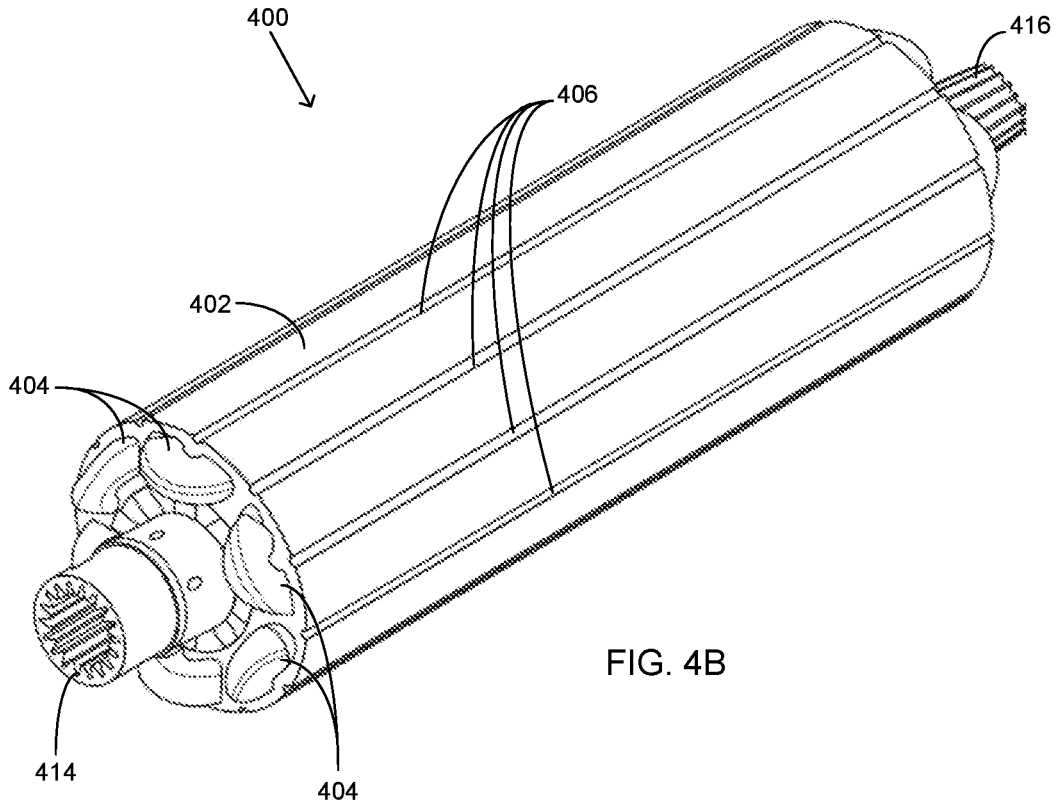
FIG. 4B depicts a perspective view of a downhole alternator assembly in accordance with some embodiments.

FIGS. 4A and 4B illustrate aspects of an alternator assembly including relative positioning of internal and external fluid channels as well as coupling interfaces for coupling two of more alternator assemblies. FIG. 4A illustrates a longitudinal cross-section view of a downhole alternator assembly 400 that includes internal coolant channels in accordance with some embodiments. Alternator assembly 400 includes an alternator casing 401 in which a rotor/stator assembly is disposed. The rotor/stator assembly includes a cylindrical stator core 402 that contains stator coil windings (not depicted) and a rotor core 408. Stator core 402 is disposed concentrically between rotor core 408 and casing 401. A fluid channel 409 extends axially through the center of rotor core 408 and may provide a fluid path for an internal coolant fluid, such as air, water, or oil that may be pressurized by an internal impeller. In alternate embodiments, and as depicted and described with reference to FIG. 2A, fluid channel 409 may be a drilling fluid channel through which a drilling fluid 411 is pumped. Alternator assembly 400 may further include stator winding fluid channels 406 that extend axially between a front end and a back end of stator core 402 and recirculate through fluid channel 409.

FIG. 4B depicts a perspective view of downhole alternator assembly 400 without casing 401 in accordance with some embodiments. As shown, fluid channels 406 comprise multiple radially distributed fluid channels extending axially along an outer surface of stator core 402 between the front end and back end of stator core 402. As shown with reference to FIG. 4A in conjunction with 4B, fluid channels 406 may form a fluid circulation path with fluid channel 409. In some embodiments, such as shown in FIGS. 3A and 3B, the coolant system may include fluid channels 406 extending axially along an outer surface of stator core 402 between the front end and back end of the stator core and may form a fluid circulation path with a plurality of axially extending cavities within which the stator windings are disposed between the front and back ends of stator core 402. FIGS. 4A and 4B further depict alternator assembly 400 as including a flexible shaft connector 414 having an internal spline coupling interface and a flexible shaft connector 416 having an external spline coupling interface coupled to respective ends of a rotor shaft. Shaft couplings 414 and 416 enable flexible coupling of alternator assembly 400 with one or more additional alternator assembly which can be electrically coupled in series (voltage or current) to boost overall power of the generator assembly that incorporates the multiple alternators.

Figure 5A:
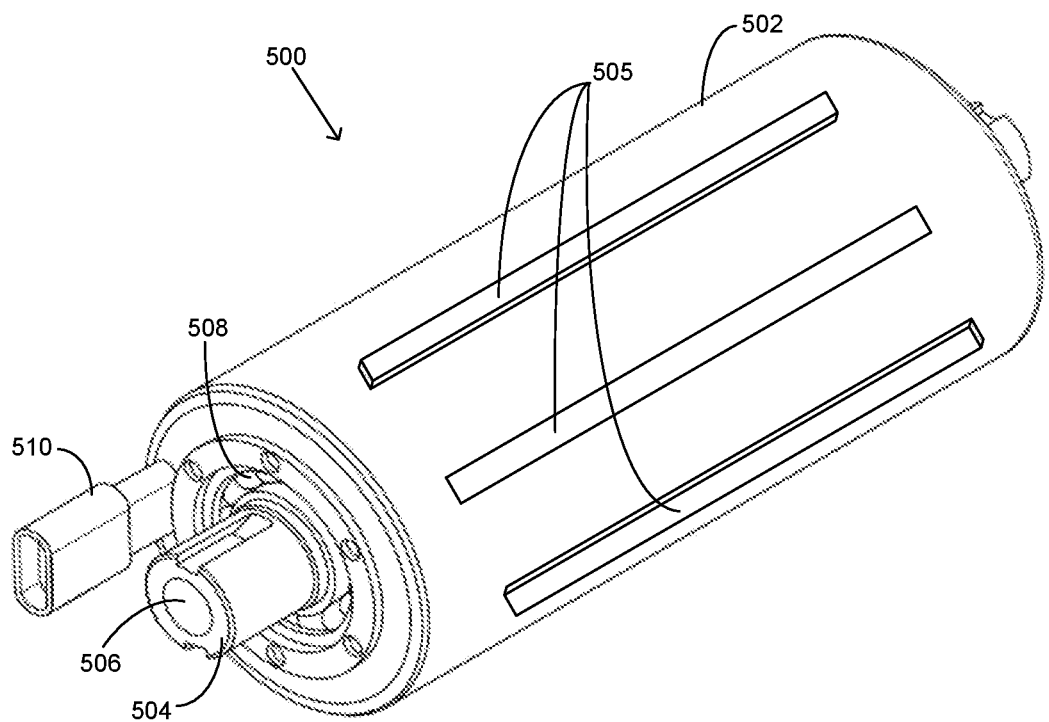
FIG. 5A illustrates a perspective view of an encased modular alternator assembly in accordance with some embodiments.

The feature of modular connectivity between two or more alternators may facilitate high-power generation (e.g., high current and/or high voltage) within the confined, elongated, and frequently non-linear borehole path within which the overall electric generator is deployed. FIG. 5A illustrates a perspective view of an encased modular alternator assembly 500 in accordance with some embodiments. Alternator assembly 500 includes an outer casing 502, which may be a metallic casing formed from a steel alloy, for example, or may comprise a non-magnetic metallic material. A rotor shaft 504 is disposed in the radial center of alternator assembly 500 and includes a center flow tube 506, such as may be a drilling fluid channel or an internal coolant fluid channel. Center flow tube 506 forming a fluid channel extends through and out both ends of casing 502, which includes a bearing 508 at each of the front and back end of alternator assembly 500 that encircles the flow tube.

As part of a modular design in which alternator assembly 500 may or may not be coupled to another alternator assembly, alternator assembly 500 includes a coupling interface in the form of an electrical connector 510. Electrical connector 510 is configured to connect alternator assembly 500 to a power conditioner assembly and therefore may not be implemented between alternator assemblies such as a set of three stacked assemblies. A bus bar connection is used between serially coupled alternator assemblies to reduce overall length by eliminating an external connector such as electrical connector 510. Multiple tabs 505 (two of which are depicted) extend above the outer surface of casing 502 to form narrow strips running axially (parallel to the longitudinal axis) of alternator assembly 500 and having sloped and tapered ends. Tabs 505 are configured to engage grooves on an inner surface of a portion of a tool body (not depicted) in which alternator assembly 500 is positioned, thereby preventing alternator assembly 500 from rotating relative to the tool body.

Figure 5B:
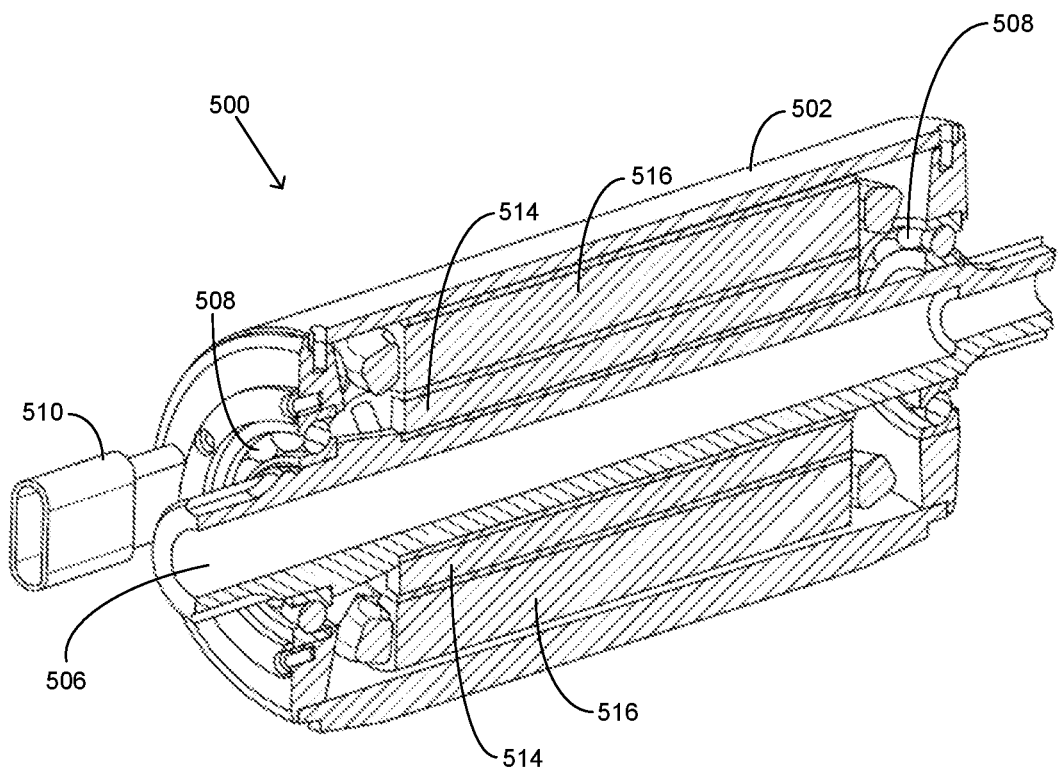
FIG. 5B depicts a cross-section perspective view of an encased modular alternator assembly in accordance with some embodiments.

FIG. 5B depicts a cross-section perspective view of modular alternator assembly 500 in accordance with some embodiments. FIG. 5B illustrates the positioning of a rotor core 514 concentrically encircling center flow tube 506 along a length of center flow tube 506. The cross-section perspective view further depicts a stator core 516 with stator coil windings concentrically encircling rotor core 514 that incudes permanent magnets.

Figure 6:
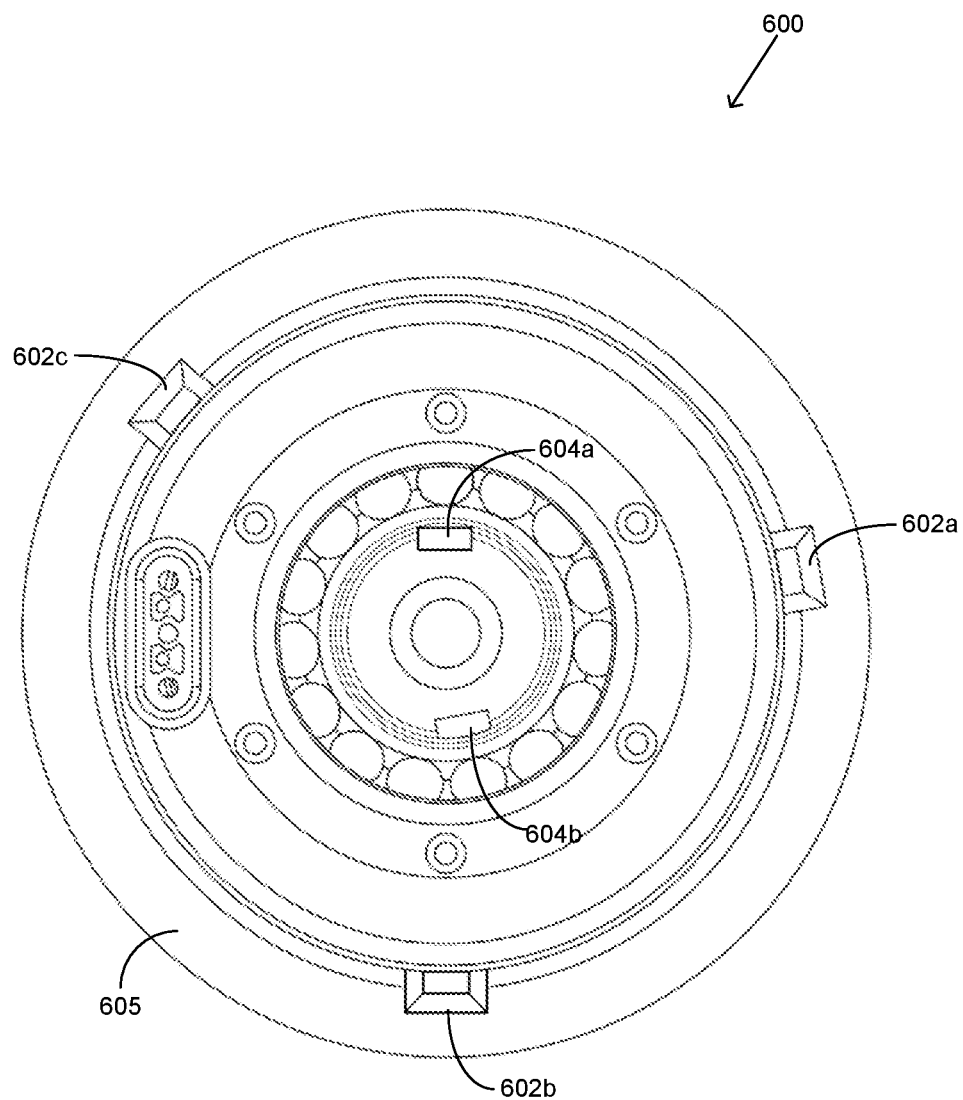
FIG. 6 illustrates a cutaway lateral view of an encased modular alternator assembly in accordance with some embodiments.
Figure 7:
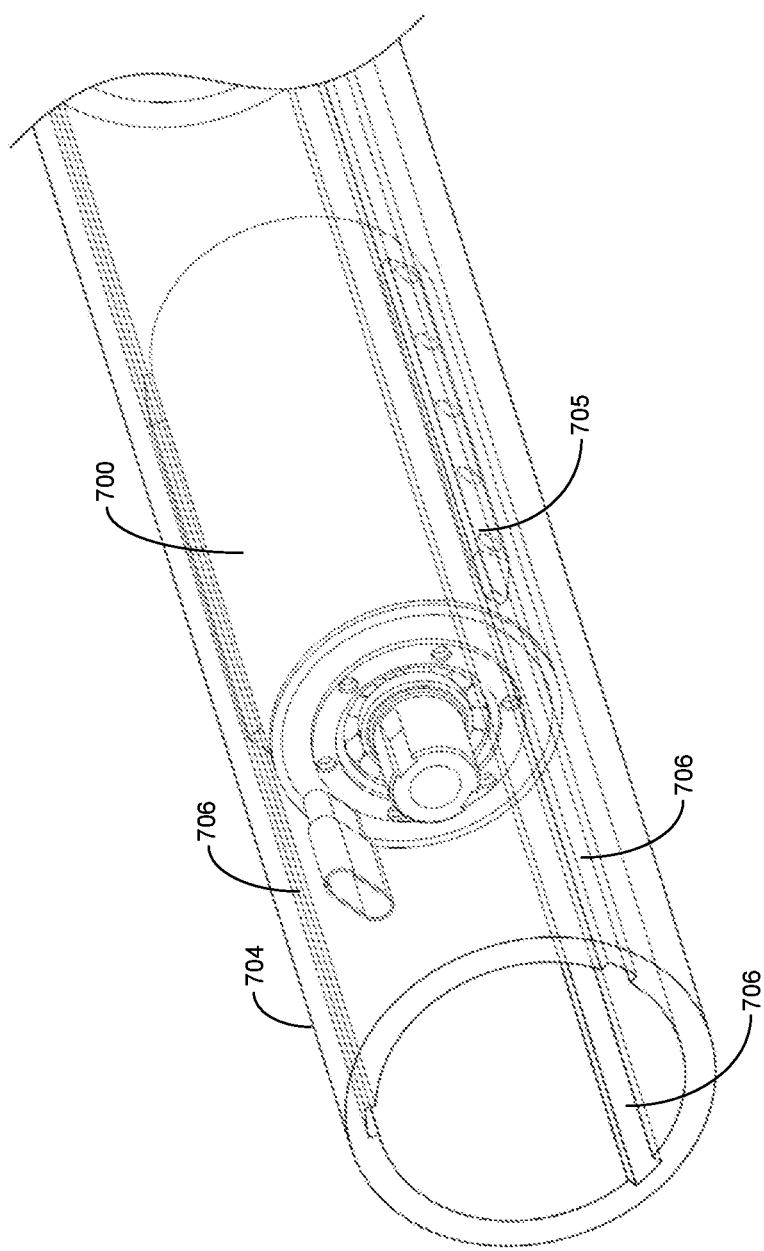
FIG. 7 depicts a perspective phantom view of a tool body encasing a modular alternator assembly in accordance with some embodiments.

FIG. 6 illustrates a cutaway lateral view of an encased modular alternator assembly 600 in accordance with some embodiments. As shown in the cutaway view, alternator assembly 600 includes a set of tabs 604a and 604b that secure the module comprising alternator assembly 600 with another alternator module. Alternator assembly 600 further includes tabs 602a, 602b, and 602c that engage in corresponding grooves formed in the inner surface of a tool body 605, such as a pump collar. For example, FIG. 7 depicts a perspective phantom view of a tool body 704, which may be a pump collar, encasing a generator module 702 that includes components of a modular alternator assembly in accordance with some embodiments. The illustrated phantom view shows generator module 702 positioned within tool body 704, with a tab 705 of the alternator housing engaged in grooves 706 formed in the inner surface of tool body 704.

Figure 8A:
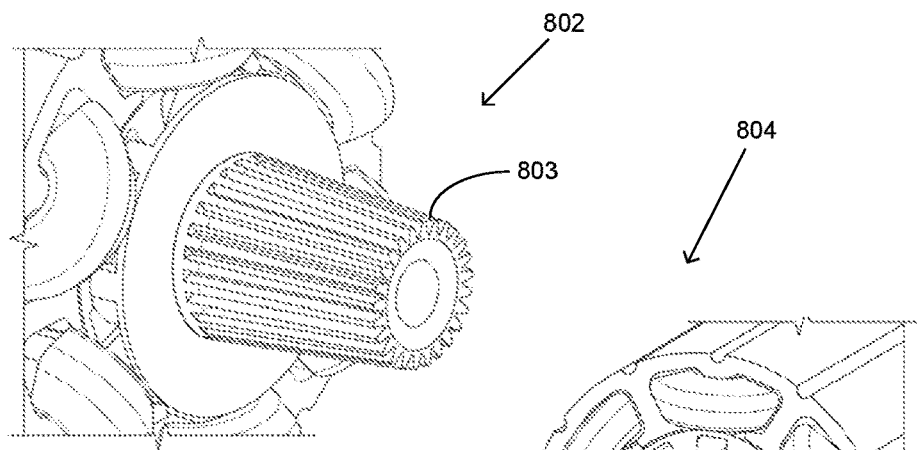
FIG. 8A illustrates a perspective view of a first connector end of a modular alternator assembly in accordance with some embodiments.
Figure 8B:
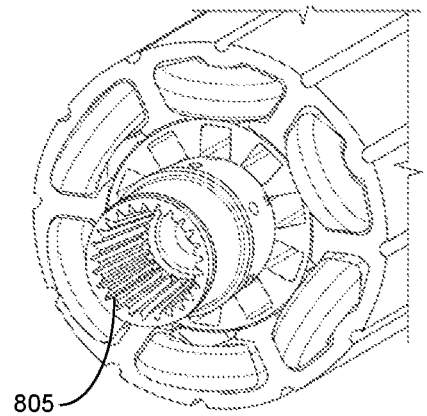
FIG. 8B depicts a perspective view of a second connector end of a modular alternator assembly in accordance with some embodiments.
Figure 8C:
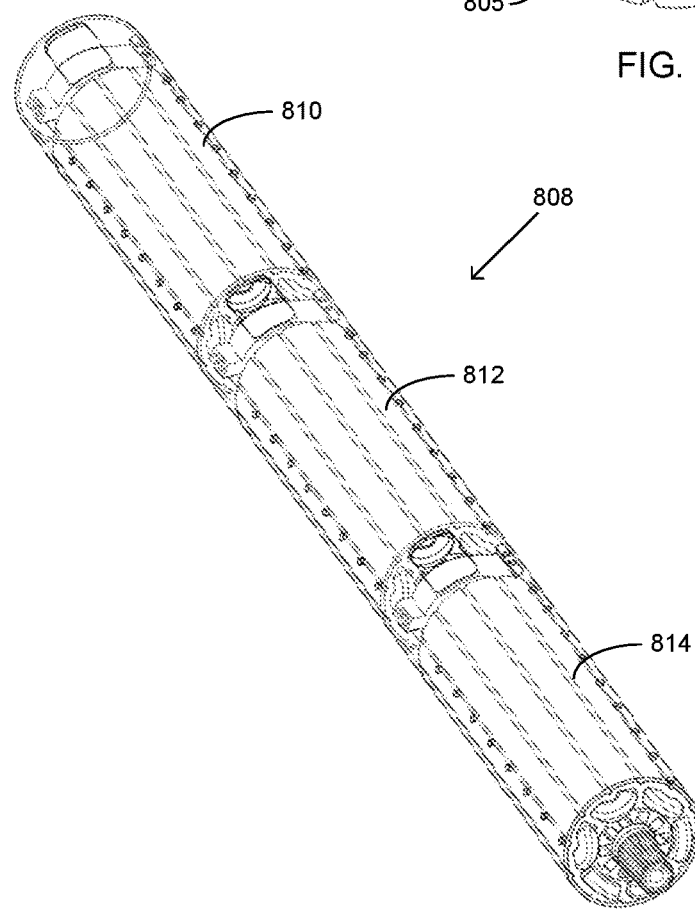
FIG. 8C illustrates a perspective view of an alternator assembly comprising three serially interconnected alternator modules in accordance with some embodiments.

The modular alternator assemblies may be mechanically coupled using flexible coupling interfaces. FIGS. 8A and 8B illustrate perspective views of a first and second connector end of a modular alternator assembly in accordance with some embodiments. FIG. 8A depicts a connector end 802 of a first alternator having an external tapered spline and FIG. 8B depicts a connector end 804 on an end portion of a second alternator having an internal tapered spline 805 configured to receive the external tapered spline. When received in the internal tapered spline 805, any rotational force occurring on external tapered spline 803 will be transferred to internal tapered spline 805 on the second alternator. Alternatively, any rotational force occurring on internal tapered spline 805 of the second alternator will be transferred to external tapered spline 803 of the first alternator. Tapered splines 803 and 805 are mechanically coupled to respective rotors of the respective alternators. Tapered splines 803 and 805 allow the rotational movement applied to a rotor of either one of the first or second alternators to be applied to the rotor of the other alternator through the coupling of the splines. In this manner, a series of two, three, or more modular alternator assemblies may be coupled together to form an overall downhole electric generator. FIG. 8C illustrates a perspective view of an alternator assembly 806 comprising three serially interconnected alternator modules 810, 812, and 814 in accordance with some embodiments.

Figure 9A:
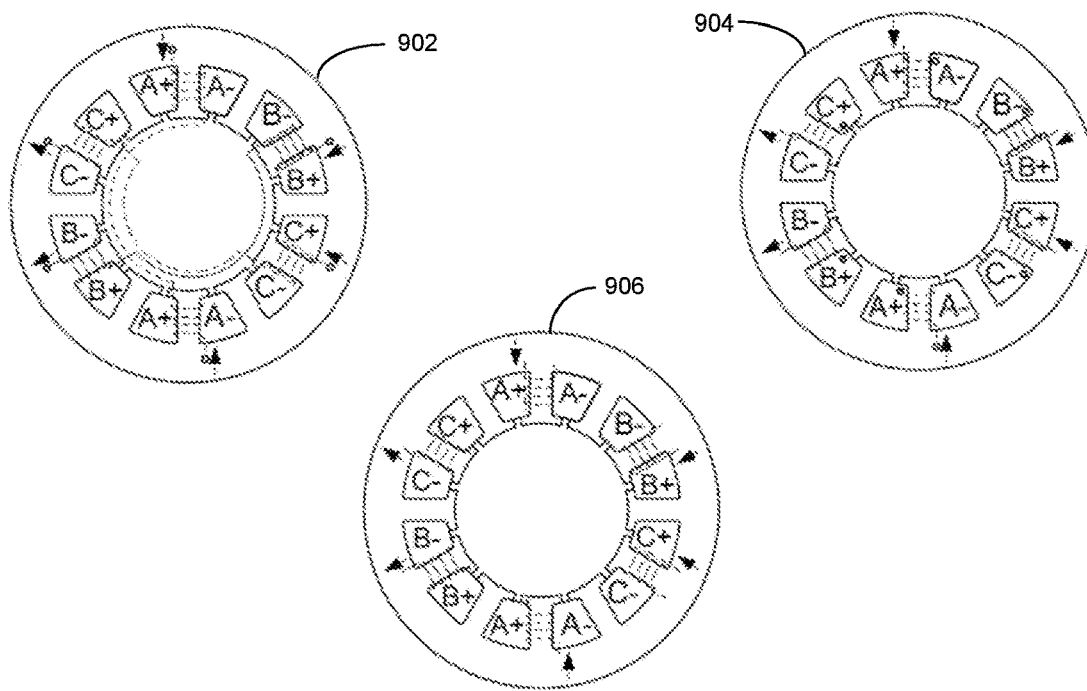
FIGS. 9A and 9B depict polar and planar views of a three-phase winding scheme that may be implemented by an alternator assembly in accordance with some embodiments.
Figure 9B:
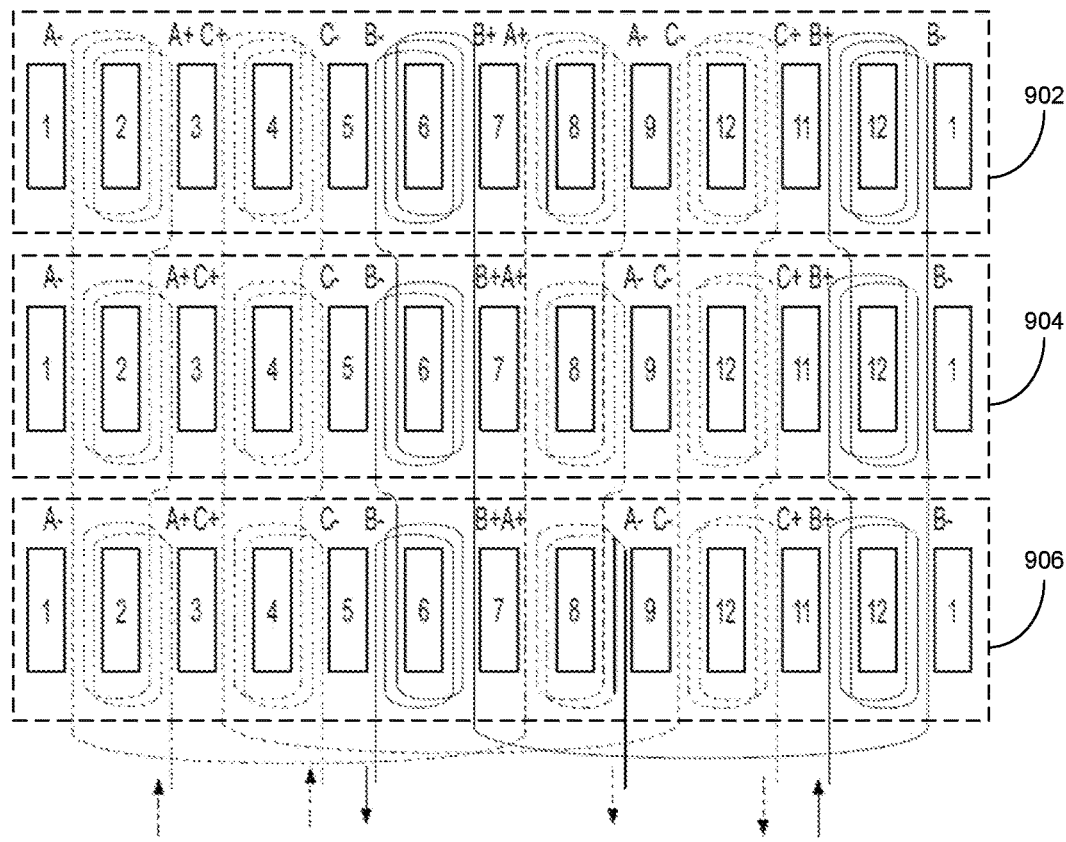

To operate an electric generator comprising three alternator modules requires appropriate electrical as well as mechanical connection. Wiring three alternator modules in series with a common shaft requires attention to how to series connect each module to the other. An example wiring scheme is depicted in FIGS. 9A and 9B, which illustrate a polar and planar diagram, respectively. FIGS. 9A and 9B depict the polar coupling between the three AC phases of a first alternator assembly stack 902, a second alternator assembly stack 904, and a third alternator assembly stack 906 coupled in series. As shown in FIGS. 9A and 9B, alternator assembly stacks 902, 904, and 906 are coupled in series by interconnections between like phases of the three depicted phases A, B, and C.

Variations

While the aspects of the disclosure are described with reference to various implementations and exploitations, it will be understood that these aspects are illustrative and that the scope of the claims is not limited to them. In general, techniques for implementing formation testing as described herein may be performed with facilities consistent with any system or systems. Plural instances may be provided for components, operations or structures described herein as a single instance. Finally, boundaries between various components, operations and data stores are somewhat arbitrary, and operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components.

Use of the phrase "at least one of" preceding a list with the conjunction "and" should not be treated as an exclusive list and should not be construed as a list of categories with one item from each category, unless specifically stated otherwise.

Example Embodiments

Embodiment 1: A downhole alternator assembly comprising: a casing; a turbine disposed within the casing and actuated by a drilling fluid flow; a rotor disposed within the casing, the rotor including, a cylindrical rotor core rotated by the turbine; a plurality of permanent magnets disposed in the cylindrical rotor core; and a drilling fluid channel extending axially through the center of the cylindrical rotor core; and a stator disposed within the casing, the stator including, a cylindrical stator core disposed concentrically between the cylindrical rotor core and the casing; conductor windings within the cylindrical stator core; and a plurality of radially distributed fluid channels extending axially within the cylindrical stator core between a front end of the cylindrical stator core and a back end of the cylindrical stator core. Embodiment 2: The downhole alternator assembly of Embodiment 1, wherein the plurality of radially distributed fluid channels include a plurality of axially extending cavities within which the conductor windings are disposed.

Embodiment 3: The downhole alternator assembly of Embodiments 1 or 2, wherein the plurality of radially distributed fluid channels include fluid channels each running axially along a cylindrical inner surface of the cylindrical stator core and forming a gap between the cylindrical stator core and the cylindrical rotor core and in fluid communication with the plurality of axially extending cavities. Embodiment 4: The downhole alternator assembly of any one of Embodiments 1-3, wherein the plurality of radially distributed fluid channels include a plurality of radially distributed fluid channels extending axially along an outer surface of the cylindrical stator core between the front end of the cylindrical stator core and the back end of the cylindrical stator core and forming a fluid circulation path with the plurality of axially extending cavities within which the conductor windings are disposed. Embodiment 5: The downhole alternator assembly of any one of Embodiments 1-4, wherein the plurality of radially distributed fluid channels contain a dielectric liquid. Embodiment 6: The downhole alternator assembly of any one of Embodiments 1-5, wherein the conductor windings have a trapezoidal cross-section contour that widens toward an outer surface of the cylindrical stator core. Embodiment 7: The downhole alternator assembly of any one of Embodiments 1-6, wherein the drilling fluid channel extending axially through the center of the cylindrical rotor core provides a flow path for drilling fluid to be pumped therethrough.

Embodiment 8: The downhole alternator assembly of any one of Embodiments 1-7, wherein the plurality of permanent magnets are radially distributed along an outer surface of the cylindrical rotor core. Embodiment 9: The downhole alternator assembly of any one of Embodiments 1-8, wherein the turbine is disposed cylindrically around at least a portion of a length of the stator or the rotor. Embodiment 10: The downhole alternator assembly of any one of Embodiments 1-9, wherein the cylindrical stator core comprises a stack of axially aligned stator laminations.

Embodiment 11: A downhole electric generator comprising: a housing; a turbine assembly within the housing, the turbine assembly including, a drilling fluid input port; and a set of turbine blades attached to a turbine shaft that is axially aligned with the drilling fluid input port, wherein the set of turbine blades are configured to contact and be driven by drilling fluid; a first alternator assembly within the housing, the first alternator assembly including, a first casing; a first rotor disposed within the first casing, the first rotor including, a first cylindrical rotor core coupled to and rotated by the turbine shaft; a first plurality of permanent magnets disposed in the first cylindrical rotor core; and a first drilling fluid channel extending axially through the center of the first cylindrical rotor core; and a first stator disposed within the first casing, the first stator including, a first cylindrical stator core concentrically disposed between the first rotor and the first casing; first conductor windings within the first cylindrical stator core; and a first plurality of radially distributed fluid channels extending axially within the first cylindrical stator core between a front end of the first cylindrical stator core and a back end of the first cylindrical stator core. Embodiment 12: The downhole electric generator of Embodiment 11, wherein the turbine assembly and the first alternator assembly are disposed within the housing that forms a segment of a drill string. Embodiment 13: The downhole electric generator of Embodiments 11 or 12, further comprising a second alternator assembly coupled to the first alternator assembly, the second alternator assembly including: a second casing; a second rotor disposed within the second casing, the second rotor including, a second cylindrical rotor core; a second plurality of permanent magnets disposed within or on the second cylindrical rotor core; and a second drilling fluid channel extending axially through the center of the second cylindrical rotor core; and a second stator disposed within the second casing, the second stator including, a second cylindrical stator core concentrically disposed between the second rotor and the second casing; second conductor windings within the second cylindrical stator core; and a second plurality of radially distributed fluid channels extending axially within the second cylindrical stator core between the front end of the second cylindrical stator core and the back end of the second cylindrical stator core; and a coupling joint member coupled with a coupling joint member of the first alternator assembly. Embodiment 14: The downhole electric generator of any one of Embodiments 11-13, wherein the coupling joint members comprise a splined flexible shaft coupling. Embodiment 15: The downhole electric generator of any one of Embodiments 11-14, wherein the first stator comprises a first stack of axially aligned stator laminations and the second stator comprises a second stack of axially aligned stator laminations, and wherein the first stack of axially aligned stator laminations and the second stack of axially aligned stator laminations are coupled in series via intra-phase winding connections. Embodiment 16: The downhole electric generator of Embodiment 15, wherein the first stack of axially aligned stator laminations and the second stack of axially aligned stator laminations comprise a plurality of stator core layers laminated and stacked together to form the first cylindrical stator core and the second cylindrical stator core. Embodiment 17: The downhole electric generator of any one of Embodiments 11-16, wherein the first plurality of radially distributed fluid channels include a plurality of axially extending cavities within which the first conductor windings are disposed. Embodiment 18: The downhole electric generator of any one of Embodiments 11-17, wherein the first plurality of radially distributed fluid channels include fluid channels each running axially along a cylindrical inner surface of the first cylindrical stator core and forming a gap between the first cylindrical stator core and the first cylindrical rotor core and in fluid communication with the plurality of axially extending cavities. Embodiment 19: The downhole electric generator of any one of Embodiments 11-18, wherein the first plurality of radially distributed fluid channels include a plurality of radially distributed fluid channels extending axially along an outer surface of the first cylindrical stator core between the front end of the first cylindrical stator core and the back end of the first cylindrical stator core and forming a fluid circulation path with the plurality of axially extending cavities within which the first conductor windings are disposed. Embodiment 20: The downhole electric generator of any one of Embodiments 11-19, wherein the first plurality of radially distributed fluid channels contain a dielectric liquid.

In some embodiments, a method includes delivering drilling mud down a pulse power drill string in a borehole. The method includes generating mechanical energy from a flow of the drilling mud being delivered down the pulse power drill string. For example, a turbine can generate the mechanical energy by rotation that is caused by the flow of the drilling mud through the turbine. The method includes converting the mechanical energy to an alternating current using a downhole alternator assembly. For example, a downhole alternator assembly can be coupled to an output of the turbine to receive the mechanical energy. The downhole alternator assembly can include a rotor disposed within a casing of the pulse power drill string. The rotor can include a cylindrical rotor core rotated by the turbine; a plurality of permanent magnets disposed in the cylindrical rotor core; and a drilling fluid channel extending axially through the center of the cylindrical rotor core. The downhole alternator assembly can also include a stator disposed within the casing. The stator can include a cylindrical stator core disposed concentrically between the cylindrical rotor core and the casing; conductor windings within the cylindrical stator core; and a plurality of radially distributed fluid channels extending axially within the cylindrical stator core between a front end of the cylindrical stator core and a back end of the cylindrical stator core. In some embodiments, the alternating current can be rectified to create a rectified current. In some embodiments, the rectified current can be considered direct current. Alternatively, the rectified current can be a current based on different types of rectification (such as half-wave and full-wave). For example, a rectifier can convert the alternating current being output by the downhole alternator assembly into a rectified current. In some embodiments, the rectified current can be stored into one or more capacitive elements in the pulse power drill string. In some embodiments, a determination can be made of whether a discharge criteria is satisfied. For example, the discharge criteria can be a criteria that a defined amount of energy has been stored in at least one of the capacitive elements. An example can be that the capacitive element(s) are fully charged, more than a defined percent (e.g., 99%, 95%, 90%, 50%, etc.), etc. Another example criteria can be that a bottom of the drill string is in contact with a bottom of the borehole. For example, the criteria can be that at least a minimum amount of surface area of the bottom of the drill string in in contact with a bottom of the borehole. Another example criteria can be that a defined amount of time has elapsed since a prior pulsing of the electrical discharge. This defined amount of time can help ensure that the bottom of the drill string is in contact with a bottom of the borehole prior to pulsing of the electrical discharge. After the discharge criteria is satisfied, an electrical discharge can be pulsed into rock of the subsurface formation based on discharging of the capacitive element(s). For example, in response to the discharge criteria being satisfied, a controller can cause the capacitive element(s) 136 to release its stored energy through electrodes in the pulse power drill string—resulting in the pulse of electrical discharge into the surrounding subsurface formation. This pulsing of the electrical discharge can continue to occur periodically in response to the discharge criteria being satisfied.

What is claimed is:

1. A downhole generator assembly comprising:
   a turbine assembly having at least one turbine actuated by a drilling fluid flow; and
   a plurality of alternator assemblies, each of the alternator assemblies comprising:
      a casing,
      a rotor disposed within the casing, the rotor including,
         a cylindrical rotor core rotated by the turbine;
         a plurality of permanent magnets disposed in the cylindrical rotor core; and
         a drilling fluid channel extending axially through the center of the cylindrical rotor core,
      a stator disposed within the casing, the stator including,
         a cylindrical stator core disposed concentrically between the cylindrical rotor core and the casing,
         conductor windings within the cylindrical stator core, and
         a plurality of radially distributed fluid channels extending axially within the cylindrical stator core between a front end of the cylindrical stator core and a back end of the cylindrical stator core, and
      an electrical interface configured to electrically couple the alternator assembly to a different alternator assembly of the plurality of alternator assemblies, the electrical interface further configured to provide electrical power generated by the alternator assembly to the different alternator assembly;
   wherein a first alternator assembly of the plurality of alternator assemblies is mechanically coupled to the turbine assembly at a first end of the first alternator assembly and wherein the first alternator assembly is mechanically connected to a second alternator assembly at a second end of the first alternator assembly, wherein rotation of the turbine causes the cylindrical rotor core of the first alternator assembly and the cylindrical rotor core of the second alternator assembly to rotate.

2. The downhole generator assembly of claim 1, wherein the plurality of radially distributed fluid channels include a plurality of axially extending cavities within which the conductor windings are disposed.

3. The downhole generator assembly of claim 2, wherein the plurality of radially distributed fluid channels include fluid channels each running axially along a cylindrical inner surface of the cylindrical stator core and forming a gap between the cylindrical stator core and the cylindrical rotor core and in fluid communication with the plurality of axially extending cavities.

4. The downhole generator assembly of claim 2, wherein the plurality of radially distributed fluid channels include a plurality of radially distributed fluid channels extending axially along an outer surface of the cylindrical stator core between the front end of the cylindrical stator core and the back end of the cylindrical stator core and forming a fluid circulation path with the plurality of axially extending cavities within which the conductor windings are disposed.

5. The downhole generator assembly of claim 1, wherein the drilling fluid channel extending axially through the center of the cylindrical rotor core provides a flow path for drilling fluid to be pumped therethrough.

6. The downhole generator assembly of claim 1, wherein the plurality of permanent magnets are radially distributed along an outer surface of the cylindrical rotor core.

7. The downhole generator assembly of claim 1, wherein the cylindrical stator core comprises a stack of axially aligned stator laminations.

8. The downhole generator assembly of claim 1, further comprising an electrical connector configured to electrically couple the downhole generator assembly to a power conditioner assembly coupled to a pulse power drill bit.

9. The downhole generator assembly of claim 1, the electrical power having at least a first phase and a second phase, wherein the electrical interface electrically couples, in series, the first phase of the electrical power of the first alternator assembly with a corresponding first phase of the second alternator assembly and the second phase of the electrical power of the first alternator assembly with a corresponding second phase of the electrical power of the second alternator assembly.

10. A downhole electric generator comprising:
a housing;
a turbine assembly within the housing, the turbine assembly including,
  a drilling fluid input port; and
  a set of turbine blades attached to a turbine shaft that is axially aligned with the drilling fluid input port, wherein the set of turbine blades are configured to contact and be driven by drilling fluid;
a first alternator assembly within the housing, the first alternator assembly including,
  a first casing;
  a first rotor disposed within the first casing, the first rotor including,
    a first cylindrical rotor core coupled to and rotated by the turbine shaft;
    a first plurality of permanent magnets disposed in the first cylindrical rotor core; and
    a first drilling fluid channel extending axially through the center of the first cylindrical rotor core;
  a first stator disposed within the first casing, the first stator including,
    a first cylindrical stator core concentrically disposed between the first rotor and the first casing;
    first conductor windings within the first cylindrical stator core; and
    a first plurality of radially distributed fluid channels extending axially within the first cylindrical stator core between a front end of the first cylindrical stator core and a back end of the first cylindrical stator core; and
  a first electrical interface configured to electrically couple the first alternator assembly to a second alternator assembly, the first electrical interface further configured to provide electrical power generated by the first alternator assembly to the second alternator assembly;
wherein the first alternator assembly is mechanically coupled to the turbine assembly at a first end of the first alternator assembly and wherein the first alternator assembly is mechanically coupled to the second alternator assembly at a second end of the first alternator assembly, wherein rotation of the turbine shaft causes the first cylindrical rotor core of the first alternator assembly and a rotor core of the second alternator assembly to rotate.

11. The downhole electric generator of claim 10, wherein the turbine assembly and the first alternator assembly are disposed within the housing that forms a segment of a drill string.

12. The downhole electric generator of claim 10, further comprising the second alternator assembly coupled to the first alternator assembly, the second alternator assembly including:
a second casing;
a second rotor disposed within the second casing, the second rotor including,
  a second cylindrical rotor core;
  a second plurality of permanent magnets disposed within or on the second cylindrical rotor core; and
  a second drilling fluid channel extending axially through the center of the second cylindrical rotor core; and
a second stator disposed within the second casing, the second stator including,
  a second cylindrical stator core concentrically disposed between the second rotor and the second casing;
  second conductor windings within the second cylindrical stator core; and
  a second plurality of radially distributed fluid channels extending axially within the second cylindrical stator core between the front end of the second cylindrical stator core and the back end of the second cylindrical stator core;
a second coupling joint member coupled with a first coupling joint member of the first alternator assembly; and
a second electrical interface configured to electrically couple the second alternator assembly to the first electrical interface of the first alternator assembly, wherein the second alternator assembly receives the electrical power generated by the first alternator assembly.

13. The downhole electric generator of claim 12, wherein the first coupling joint member comprises a first splined flexible shaft coupling member and the second coupling joint member comprises a second splined flexible shaft coupling member.

14. The downhole electric generator of claim 12, wherein the first stator comprises a first stack of axially aligned stator laminations and the second stator comprises a second stack of axially aligned stator laminations, and wherein the first stack of axially aligned stator laminations and the second stack of axially aligned stator laminations are coupled in series via intra-phase winding connections.

15. The downhole electric generator of claim 14, wherein the first stack of axially aligned stator laminations and the second stack of axially aligned stator laminations comprise a plurality of stator core layers laminated and stacked together to form the first cylindrical stator core and the second cylindrical stator core.

16. The downhole electric generator of claim 10, wherein the first plurality of radially distributed fluid channels include a plurality of axially extending cavities within which the first conductor windings are disposed.

17. The downhole electric generator of claim 16, wherein the first plurality of radially distributed fluid channels include fluid channels each running axially along a cylindrical inner surface of the first cylindrical stator core and forming a gap between the first cylindrical stator core and the first cylindrical rotor core and in fluid communication with the plurality of axially extending cavities.

18. The downhole electric generator of claim 16, wherein the first plurality of radially distributed fluid channels include a plurality of radially distributed fluid channels extending axially along an outer surface of the first cylindrical stator core between the front end of the first cylindrical stator core and the back end of the first cylindrical stator core and forming a fluid circulation path with the plurality of axially extending cavities within which the first conductor windings are disposed.

19. The downhole electric generator of claim 16, wherein the first plurality of radially distributed fluid channels comprise a closed cooling system containing a dielectric liquid.

20. The downhole electric generator of claim 10, wherein the electrical power has at least a first phase and a second phase, wherein the first electrical interface electrically couples, in series, the first phase of the electrical power of the first alternator assembly with a corresponding first phase of the second alternator assembly and the second phase of the electrical power of the first alternator assembly with a corresponding second phase of the electrical power of the second alternator assembly.

* * * * *